March 1, 1960 G. J. R. PIEL 2,927,312

ANALOG-TO-DIGITAL CONVERTER SYSTEM

Filed Feb. 15, 1954 2 Sheets-Sheet 1

INVENTOR.
GERARD JEAN RENÉ PIEL

BY Theodor Haake
ATTORNEY

INVENTOR
GÉRARD JEAN RENÉ PIEL
BY Theodore Hafner
ATTORNEY 2,927,312

ANALOG-TO-DIGITAL CONVERTER SYSTEM

Gerard Jean René Piel, Paris, France, assignor to Societe d'Electronique et d'Automatisme, Courbevoie, France Application February 15, 1954, Serial No. 410,120

Claims priority, application France February 19, 1953

13 Claims. (Cl. 340—347)

Figure 1:
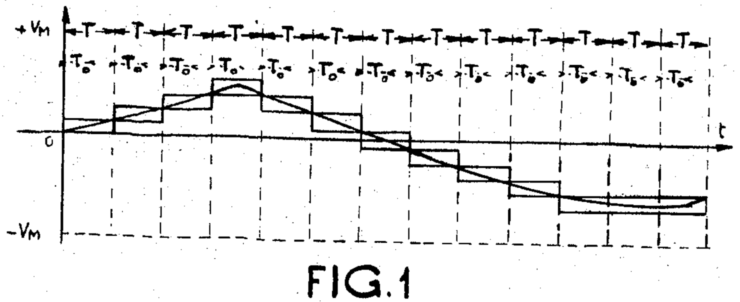

The present invention relates to an electronic device for converting the voltage-analog representation of a quantity into the binary digital representation of that quantity. Such a device is herein called an "analog-to-digital converter."

As is well known, a binary digital code or representation of a numerical quantity U is written as follows:

$$U=a_0a_1a_2 \ldots a_n$$

being a mere contraction of the conventional development:

$$U=a_0.2^0+a_1.2^1+a_2.2^2+ \ldots +a_n.2^n$$

by omitting the weights $2^0, 2^1, 2^2, \ldots, 2^n$ of the terms of the above development, then read in accordance with an arbitrarily defined sequence of terms. Of course, in the binary system of numeration, the coefficients $a_0$, $a_1$, $a_2$, . . ., $a_n$ cannot have digital values other than one or zero.

The storing or registering of a number in a digital machine may be effected dynamically or statically.

A number may be represented by a succession of signals travelling along a delay line or impressed on magnetic material in the form of the surface of a drum which is rotated under one or more reading heads. These signals are moving relatively to the places at which they are read and only become available at certain times. This is known as dynamic storage.

This specification however is more concerned with static registration. A number may be stored in a register by the configuration of counting wheels, relays, tubes or other means so that the number is always available and can be read at certain places at any time until the register is reset. Such a register will be hereinafter called a "static register."

In this specification, further, the term "static accumulator" will be used to designate a device incorporating a static register and further adapted for both registering a number and for adding algebraically, numbers supplied thereto, so that the content of the register therein always represents the algebraic sum of the numbers successively supplied to the said static accumulator.

A static register as well as a static accumulator may be provided with means for shifting a registration to the left or to the right for any number of digit places, thus effecting division or multiplication by integral powers of 2. Such a register or accumulator will be said to have a "shiftable registration" and a registering member having a shiftable registration will be called a "shiftable register."

A pulse counter of algebraic operation is apparently a kind of accumulator since it is able both to register a numerical count and to add algebraically to the previous content thereof any new count of pulses supplied to its input.

The registration content of a static register or accumulator may be "read-out" by suitable means in the form of a coded pulse train representing the successive coefficients $a_0$, $a_1$, . . . $a_n$ (or in the reverse order $a_n$, $a_{n-1}$, . . . $a_1$, $a_0$) of the binary digital representation of the quantity registered. The said registration content may also be formed into an analog-voltage representing the quantity registered by a circuit or component herein called a "decoder."

From a general point of view, an analog-to-digital conversion may be considered as carried out in two steps. As the first step, the voltage (analog) representation is analysed or measured and the magnitude so found is converted into a set of voltages, each voltage having the one or the other of two voltage values, hereinafter called higher and lower values, which represent the digital values one and zero. The set of voltages is registered in staticized form in a static register until the second step is carried out. As the second step, an electrical reading of the static register is effected for generating a binary-coded pulse train in which the time-distribution of the pulses gives the required binary-digital representation of the magnitude of the analog-representing voltage at the time when it was analyzed or measured.

A digital binary code as above-defined is made algebraic by adding to the said set of voltages an additional voltage, which may have either one or the other of two values respectively representing the plus and the minus sign. When the statically registered code is read, this sign-representing voltage is represented in an additional pulse period of the binary-digital representative train of electrical pulses, and in accordance with accepted practice the sign-representing pulse period is made to occur at the head of said train.

A decoder may be associated with any static register or accumulator for reconstituting from any overall condition of selected plate outputs of its stages a voltage-analog representation of the numerical quantity which is contained in the register. The decoded analog-voltage is based on an arbitrary voltage scale and, of course, this scale may be choosen the same as the voltage scale of any input analog-voltage to be converted.

One of the objects of the invention is to provide an improved analog-to-digital converter.

Another object of the invention is to provide an analog-to-digital converter capable of converting into a binary-digital representation an analog-voltage which can vary within wide limits, without however changing by more than a definite fraction of its maximum possible shift within any time interval occurring between two consecutive samplings for conversion.

According to one feature of the invention, an analog-to-digital converter comprises in combination, a static accumulator and a decoder therefor, means for receiving an input analog-representative voltage and subtracting therefrom the output voltage of said decoder, and means for deriving a binary-digital representation of the difference-representative voltage thus formed and applying said binary-digital representation to said static accumulator, whereby the numerical content of this accumulator is changed by the numerical value of said difference voltage representation.

According to another feature of the invention, an analog-to-digital converter comprises in combination, a static accumulator and a decoder therefor, a static register and a further decoder therefor, means for receiving an input analog-representative voltage and subtracting therefrom the output voltage of the decoder of said static accumulator and also combining with said voltages the output voltage of the decoder of said static register, means for varying the setting of said static register until the combination voltage is brought to a predetermined value, means for reading the setting of said static register when this has been done and for totalizing the binary-digital representation thus formed with the content of said static accumulator.

Figure 2:
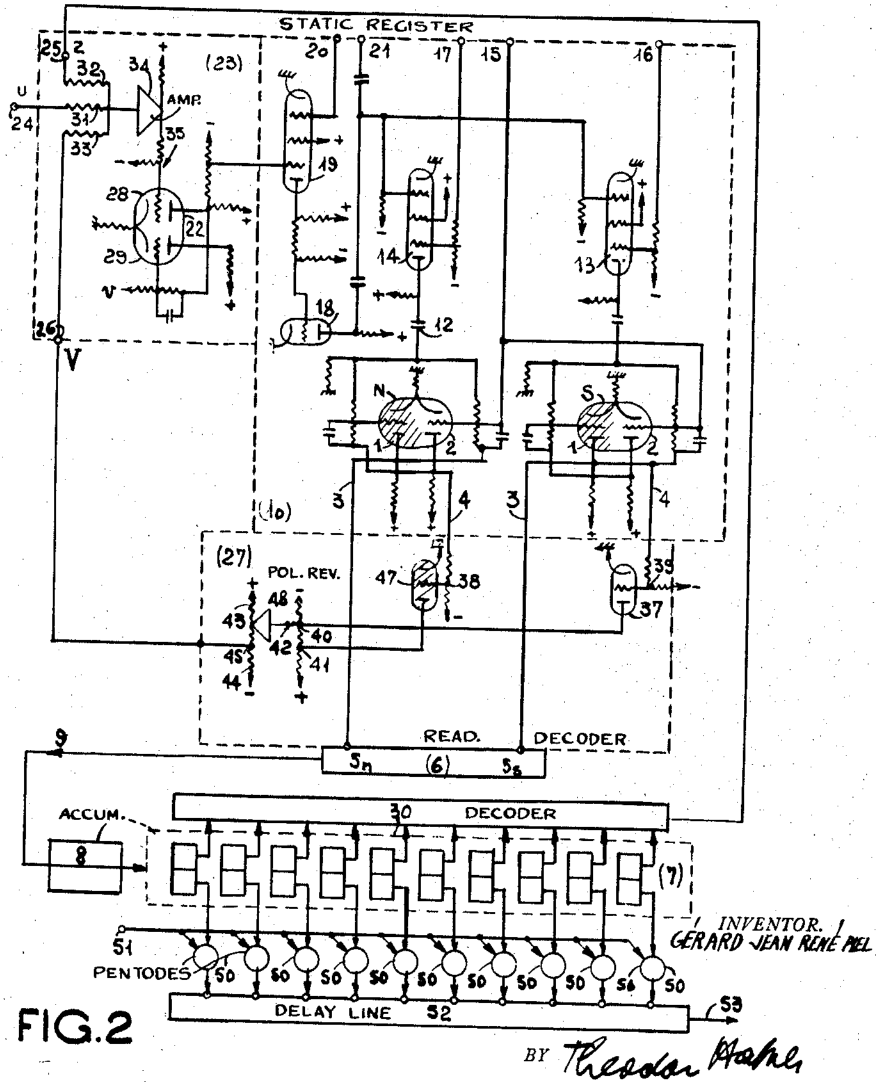
Figure 3:
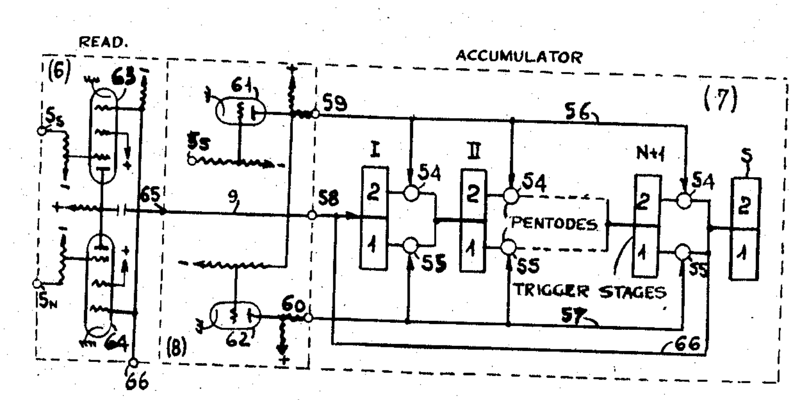
Figure 4:
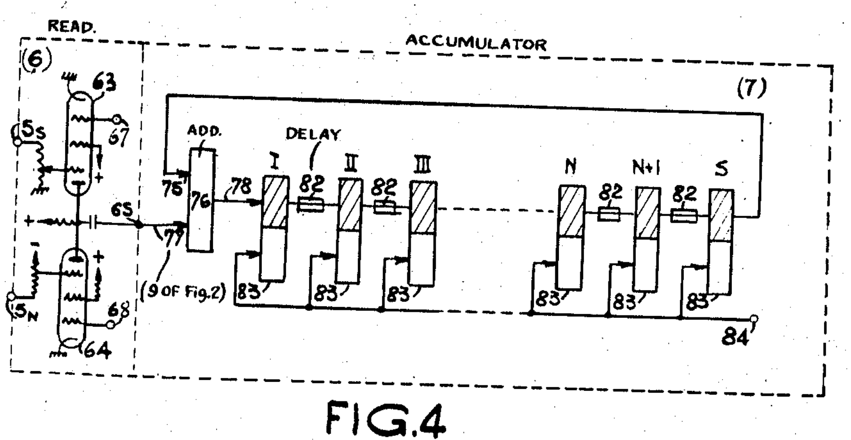
Figure 5:
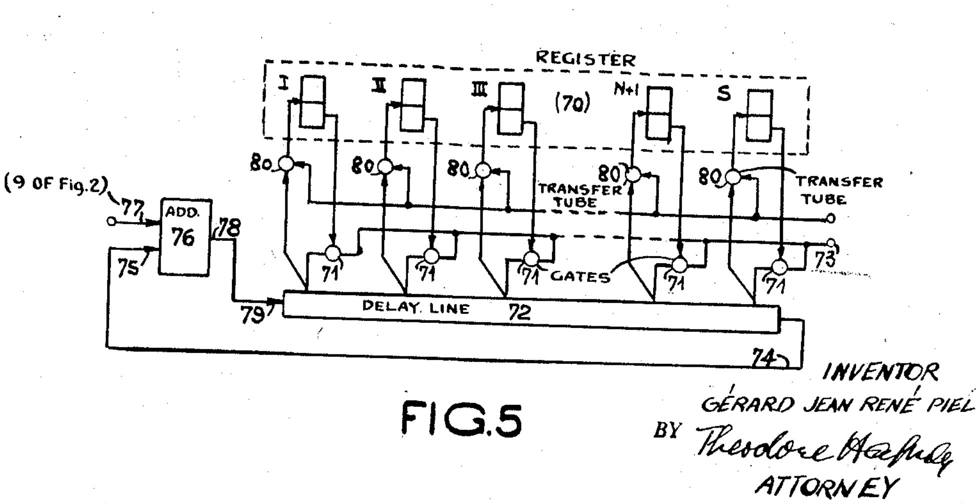

These and other objects of the invention will be more fully apparent from the attached drawings, wherein:

Fig. 1 shows an example of an analog-voltage representation;

Fig. 2, a diagram embodying certain principles of an analog-to-digital converter according to the invention;

Fig. 3, a part of this diagram for the case that the static accumulator comprises an algebraic counter;

Fig. 4, a part of this diagram for the case that the static accumulator comprises a static register capable of step-by-step shifting;

Fig. 5, a part of said diagram for the case that the static accumulator thereof comprises a static register including separate bistable trigger stages.

The diagrams of Figs. 3 to 5 represent three examples of a static accumulator together with its control circuitry.

The analog-representing voltage of Fig. 1 can vary on either sides of its zero value. Its changes in time cannot exceed a definite voltage fraction or step of its maximum value $|U_M|$ within each time interval such as T. During each time interval T there is provided an arbitrary time interval $T_0$ during which the conversion process must occur. The relative value $T_0$ must be chosen, together with and with respect to the value T, according to practical conditions of service of the converter in any computing system wherein it may be incorporated. Preferably, a choice will be made leading to the condition that the analog-representative voltage cannot vary by a greater quantity than one voltage step. The voltage representing the algebraic difference between the value of the analog-representing voltage at a time where a conversion must occur and the value of that voltage at the time where the next preceding conversion occurred, can then be expressed by either one of the three digital values −1, 0 and +1 according to whether the analog-representing voltage has decreased, or remained substantially constant, or has increased within the concerned time interval $T—T_0$.

In an analog-to-digital converter according to the invention there is provided a static register for such a difference voltage. Such static register is shown at 10 in Fig. 2, in the form of a particular embodiment. With respect to the setting of Fig. 1, static register 10 comprises two trigger stages, viz. a sign-denoting trigger stage S and a digital value-denoting trigger stage N. If, for instance, a conversion is to occur at a lower speed, e.g. at a recurrence time of 3T, static register 10 will comprise two digital value-denoting trigger stages, and so forth.

When both stages S and N are in the conditions shown, stage S in its plus-sign condition and stage N in its binary-zero condition, static register 10 marks 0. When stage S is in its minus-sign condition and stage N is in its binary-zero condition, static register 10 marks −1. When stage S is in its plus-sign condition and stage N in its binary-one condition, static register 10 marks +1. As will be apparent from the following, both stages N and S cannot be at the same time in their binary-one and minus sign conditions (which would indicate 0). The above convention is quite usual in conventional technique of handling algebraic codes.

Each trigger stage N.S comprises a pair of tubes 1 and 2, for instance the two triode elements of a double-triode vacuum tube, conventionally so interconnected that one of these tubes is "on" when the other is "off." For the stage N, the binary-zero condition is met when tube 1 is "on" and tube 2 is "off." For stage S, the plus-sign condition is met when tube 1 is "on" and tube 2 is "off."

Plate outputs 3 of tubes 1 of trigger stages N, S are respectively connected each to the inputs 5 of a reading circuit 6. The particular structures of this circuit 6 will be detailed further below because they depend upon the kind of static accumulator used in the converter. Output line 9 of reading circuit 6 is connected to the input circuit 8 of the static accumulator 7.

Actuation of each trigger stage N.S. of static register

10 may be caused to occur, as shown, in parallel at both control grids, by pulses of negative polarity. The actuation input of stage N is connected, through a capacitive coupling 12, to the plate of a pentode tube 14. Similarly actuation input of the stage S is connected to the plate of a pentode tube 13. These pentode tubes are caused to be unblocked consecutively, tube 13 first, at the beginning of each conversion period and after a resetting of the static register N—S from reset input 15, upon reception of gating pulses which control the suppressor grids of tubes 13, 14 respectively. From input 16, tube 13 first receives such a gating pulse $d_s$ and once this signal disappears, tube 14 receives from the input 17 its gating pulse $d_n$. When no gating pulse of this kind exists, tube 13, or 14, remains blocked or non-conducting.

During gating pulse $d_s$, an impulse $d_0$ is applied to the control grid of a pentode tube 19 and is transmitted if that tube is unblocked. Tube 19 feeds an inverter tube 18 and the plate of tube 18 is connected to the control grids of both tubes 13 and 14.

During gating pulse $d_n$, a test impulse $d_t$ is first applied for an input 21 to the control grid of tube 14; it is immaterial that this impulse is also applied to tube 13, which at this time is blocked. A $d_0$ impulse follows on the input 20.

The $d_0$ impulses applied at 20 are transmitted when tube 19 is unblocked during control of its suppressor grid. This control is exerted from an astable trigger stage 22 included in an input circuit 23. In circuit 23 there are added the three following voltages: the analog-representing input voltage U applied to the terminal 24; the analog-representing voltage Z from the static accumulator decoder 30, applied to terminal 25; voltage V from decoder 27 of static register 10, applied to terminal 26. The algebraic summing means comprise a resistance mixer including the three resistors 31, 32, 33 and a follow-up amplifier 34 which passes the D.C. component. Amplifier 34 will be considered as delivering an output signal of the same polarity as its input. For instance amplifier 31 may comprise two D.C. amplifier tubes in cascade connection. The voltage V is zero at each start of a conversion period as soon as static register 10 has been reset, or alternatively it may be made zero by a reset applied at the end of each encoding or conversion period. The voltage Z is of a polarity opposite to that of voltage U, whichever is that last polarity.

The difference voltage which is thus combined with an auxiliary voltage results in the issuance from the amplifier 34 of a resulting voltage which is applied to a control input 35 of the astable trigger stage 22. This stage presents an asymmetrical circuitry and its control is effected by direct current voltage. The plate of tube 28 is connected at 29 to the suppressor grid of the tube 19 and also is connected to the control grid of the tube 29 through a time-constant network. The control grid of tube 29 receives a predetermined bias $v$ of such a value that this tube is "off" when the voltage at 35 is zero or of positive polarity, the tube 28 being then "on."

The decoder circuit of the static register 10 may for instance be constituted as follows: The plate output 4 of trigger stage S includes a voltage dividing network connected to the control grid of a triode 37. By this network, the triod 37 is turned "off" when tube 1 of the stage S is conducting or "on" (trigger stage S being in its plus-sign condition) and is turned "on" when tube 1 is "off" (trigger stage S being in its minus-sign condition). From plate output 4 of tube 2 of trigger stage N, and through a similar voltage-dividing network 38, another triode 47 is similarly controlled. Triode 47 will be "on" when stage N is in its binary-zero condition and "off," and will be "off" when stage N is in its binary-one condition. The plate supply voltages for triodes 37 and 47 are fed from respective points 40 and 41 of a voltage-dividing potentiometer 42, wherein the values of the resistances from 40 to 41 and from 41 to (+) are equal. At point 40, this potentiometer is connected to the input of a polarity-reversal stage 48. The output of stage 48 comprises a potentiometer 43—44 connected between a (—) and a (+) battery supplies and point 45 serves as an output point terminal for the decoded voltage.

When static register 10 is brought to its reset condition, as shown, triode 37 is "off" and triode 47 is "on." This latter tube produces a voltage drop, R.*i*, in network 42. The voltage applied to the polarity-reversal stage 48, then is such that point 45 of the output network is brought to a zero voltage.

When static register 10 is brought to its condition marking the alegbraic value —1, trigger stage S being in its minus-sign condition and trigger stage N being in its binary-zero condition, both triodes 37 and 47 are "on." An additional voltage drop of value R.*i* is further added to the preceding voltage drop of value R.*i*. The voltage transferred to the output point 45 increases by one voltage step and the voltage V has a value equal to +1.

When static register 10 is brought to its condition marking the algebraic value +1, trigger stage S is in its plus-sign condition and trigger stage N in its binary-one condition. Both triodes 37 and 47 are "off," no voltage drop occurs in network 42 and the output point 45 has its voltage value brought to a negative step. The voltage V has a value equal to —1.

Without giving further details, the operation of the analog-to-digital converter diagram shown in Fig. 2 may be expressed as follows:

Static accumulator 7 contains a numerical quantity which is represented by the analog-voltage Z. This voltage cannot be different by more than one voltage step from the input analog-representing voltage U at the terminal 24, but voltage Z is of opposite polarity with respect to the polarity of voltage U.

In case the alegbraic sum $U+Z$ is positive, denoting an increase of one step (+1) of U, the numerical quantity +1 must be added to the content of the static accumulator 7.

At the beginning of a conversion period, the voltage V from the decoder 27 is zero. Then the amplifier 34 will deliver a positive voltage to the actuation input 35 of the astable trigger stage 22. In this stage, the triode element 28 is "on" and transfer tube 19 is blocked.

The incoming signal $d_s$ unblocks transfer tube 13. The $d_o$ impulse which occurs at 20 during signal $d_s$, is not transmitted by the tube 19. Trigger stage S remains in its plus-sign condition.

Signal $d_s$ disappears and signal $d_n$ is applied to tube 14. Test impulse $d_t$ is applied to terminal 21 and is passed through tube 14, then actuating trigger stage N, which arrives at its binary-one condition. Static register 10 marks +1 and the output voltage V of its decoder 27 becomes —1. The voltage issuing from 34 becomes zero. Stage 22 remains in the same condition as it was, and tube 19 remains blocked. Then the $d_o$ impulse occurring at 20 is not transmitted and trigger stage N remains in its binary-one condition. Static register 10 marks +1 and its reading at 6 gives rise to a pulse train coded as +1. This quantity, through input circuit 8 is transferred to accumulator 7 wherein it is added to the contents thereof.

If now input voltage U does not change during the following period, when a new period of conversion occurs, the algebraic difference $U+Z$ will be zero. Static register 10 delivers a zero value of voltage V. Trigger stage 22 has its tube 28 "on" and tube 19 is blocked. When signal $d_s$ occurs, tube 13 is unblocked but the $d_o$ impulse cannot reach tube 13, and trigger stage S remains in its plus-sign condition. When signal $d_n$ occurs, the test impulse $d_t$ brings the trigger stage N to its binary-one condition but also brings voltage V to its value —1. Tube 28 is turned "off," tube 19 is unblocked and the $d_o$ pulse is transmitted through tube 14 to trigger stage N which is reset to its binary-zero condition. Static register 10 marks 0. Its reading will bring a zero pulse train towards accumulator 7 which preserves its numerical content unchanged.

Considering then a decrease by substantially one voltage step of the voltage U, the difference between U and —Z will be —1. For the next following conversion period, this negative voltage issuing from 34 turns triode 28 "off" and then tube 19 is unblocked.

With signal $d_s$ being applied at 16, tube 13 is unblocked and transmits the $d_o$ impulse which is passed through tube 19. The sign-denoting stage S comes to its minus-sign condition and voltage V is brought to value +1. The voltage issuing at 35 is made equal to zero, the stage 22 swings over and the tube 19 is blocked. The test impulse $d_t$ passes through tube 14 when signal $d_n$ is applied at 17 and stage N comes to its binary-one condition. Voltage V is brought back to zero, and the voltage at 35 to its negative value. Tube 19 is unblocked and thus passes $d_o$ impulse which resets the stage N to its binary-zero condition. Static register 10 is set to —1 and the numerical quantity —1, read at 6 will be transferred to accumulator 7 wherein the numerical quantity contained thereon decreases by one unit.

In any of the embodiments of the accumulator 7 which will be later described, the reading device may be made as follows:

Each bistable trigger stage of accumulator 7 controls from the plate output of one of its two tubes, preferably that which is "on" when the stage is in its binary-zero condition, the suppressor grid of a pentode tube 50. All tubes 50 receive on their control grids, at any required instants of time outside of any conversion period $T_0$, a reading impulse applied to a single terminal 51. The plate outputs of tubes 50 are distributed along input taps of a delay line 52 of the type for example of an artificial electromagnetic delay line. Each reading of accumulator will thus give rise to the issuance at 53 of a coded pulse train representing the digital value of input voltage U at preceding conversion period, as expressed in the binary system of numeration.

As is stated above, static accumulator 7 may comprise a pulse counter operating as an algebraic and, obviously reversible, counter. Fig. 3 discloses an example of such a counter, together with the reading arrangement 6 of static register 10. The accumulator 7 comprises a number $(n+1)$ of binary bistable trigger stages, denoted from 1 to $N+1$, and at the end of this cascade, a sign-denoting stage S. These stages are, for instance, of the same kind as the stages disclosed in static register 10 in Fig. 2. The cascade connection of trigger stages I to S is arranged along two channels, one channel for counting and the other one for decounting. The counting channel is established by the provision of a pentode tube 54 receiving on its control grid the pulses issuing from tube 2 of a trigger stage and having its pulse output connected to a symmetrical actuation input of the following trigger stage. The decounting channel is similarly established by the provision of a pentode tube 55 receiving on its control grid the pulse output of the tube 1 of a trigger stage and delivering its own pulse output to the same symmetrical actuation input of next following trigger stage. The tube 1 is the tube in a trigger stage which is "on" in the binary-zero condition of that stage, tube 2 is the tube which is "off" in the same condition. Pentode tubes 54 and 55 of an interstage coupling may have a common plate load.

Each of tubes 54 and 55 has a bias on its suppressor grid, which is too low to be normally unblocked. From a connection 56 for the set of tubes 54, and from a connection 57 for the set of tubes 55, unblocking potentials may be supplied to these tubes. However the potentials of these connections always are in reciprocal or reverse conditions: When connection 56 is carrying a high potential, thus unblocking set of tubes 54, the connection 57 is carrying a low potential, and conversely for the other direction of progression in the counter.

A reversible counter of this kind presents three inputs: for actuation input 58 to the symmetrical actuation input of the first stage I and two inputs 59 and 60 for the control of the sets of tubes 54 and 55, respectively.

The potentials of the connections 56 and 57 are applied from terminals 59 and 60 of voltage dividing networks provided respectively, for example, in the plate circuits of two triodes 61 and 62. The plate output of triode 61 is also connected to the control grid of the triode 62 so that these triodes always are in reverse conditions of conductibility. If triode 61 is "on," triode 62 is "off" and conversely. The control voltage for triode 61 is supplied from terminal $5_s$ of reading circuit 6 of the static register 10 so that when the sign-denoting trigger stage S of register 10 is in its minus-sign condition, the triode 61 is "on" and triode 62 is "off" and when stage S is in its plus-sign condition, triode 61 is "off" and triode 62 is "on." For minus-sign condition, connection 57 bears a high potential and tubes 55 are unblocked; for plus-sign condition, connection 56 is at a high potential and tubes 54 are unblocked.

The reading circuit 6 proper may comprise a pair of tubes 63 and 64, for instance pentode tubes. At the reading instant, these tubes receive a positive pulse from 66 upon their control grids. Tube 63 is blocked or unblocked by voltage appearing at the terminal $5_s$ according to whether the trigger stage S is or is not in its binary-zero condition. Tube 64 is controlled by the voltage appearing at terminal $5_n$ and is blocked or unblocked according to whether trigger stage N is or is not in its binary-zero condition. From above description, only one of the tubes 63 and 64 can be unblocked at any time, but both tubes can be blocked at any time when static register 10 marks 0.

Both tubes 63 and 64 have a plate output which, at 65, is connected to the actuation input 58 of the counting chain proper.

Upon considering, first, the counter 7 in its overall zero condition and the static register 10 denoting the numerical value +1, trigger stage S in the plus-sign condition, trigger stage N in the binary-one condition. Tube 61 is "off" and the tube 62 is "on." The tubes 54 are unblocked and tubes 55 are blocked. The reading of the register 10 delivers at 58 an electrical impulse which brings to work the first trigger stage of counter 7. With tube 55 from stage I being blocked, the counter remains in that condition.

At following conversion period, for instance, register 10 is set to condition −1, tube 61 is "on" and tube 62 is "off," tubes 55 are unblocked and the tubes 54 are blocked. The reading of the register 10 delivers an impulse which brings back the counter to zero. With tube 54 being blocked, the counter remains in such a condition.

If now static register 10 is set to −1 at the following conversion period, the conditions are the same as above but the electrical impulse which actuates the first stage I to its binary-one condition, leads to the actuation of the second stage II to its binary-one condition, and so forth until all the trigger stages of the counter, including the last trigger stage S, are set to this binary-one condition. Since the input of the last stage is connected back, through a connection 66 to actuation input 58, the impulse issuing from stage $N+1$ is re-applied to the first stage I, which is reset to its binary-zero condition. The counter thus contains the numerical quantity −1, according to a well-known convention.

With register 10 marking +1 at the next following conversion period, tubes 54 are unblocked and tubes 55 are blocked. The reading impulse transferred from tube 64 brings the stage I to its binary-one condition. All the counter stages including the sign-denoting stage are in their binary-one condition and this is interpreted for such a counter as a zero condition as well as the overall binary-zero condition.

If then register 10 again marks +1 at following period of conversion, tubes 54 are unblocked and the tubes 55 are blocked. The impulse which brings back to its binary-zero condition the first stage I, produces the general reset of the complete chain of trigger stages including the sign-denoting stage; however from the feedback connection 66, the first stage I is reset to work and the counter marks +1, as required.

The decoder which may be associated with such a reversible counter, for example decoder 30 of Fig. 2, may be a mere extension of the arrangement shown for decoder 27 wherein, of course stage II will produce a voltage drop of two steps, stage III a voltage drop of four steps, and so forth, the actuation of the stage S to its minus-sign condition causing a voltage drop which balances out the sum of the other drops.

In case static register 10 comprises several trigger stages for denoting several binary digits, the following changes may be made to Fig. 3:

Each digit-denoting stage of the register will have associated therewith, a special tube 64 but the tube cooperating with the second stage will receive two consecutive pulses for reading, the tube cooperating with the third stage will receive four pulses, and so forth. Tube 63 will be omitted but each tube 64 will have associated therewith a tube $\overline{64}$ in a reverse condition of conductibility with respect to its tube 64, being controlled for instance from the plate output of the other triode of the stage. The selection of one or the other of these tubes 64—$\overline{64}$ will be controlled for the reading of register 10 from the sign-denoting stage in this register; for instance the plate outputs of this sign-denoting stage will respectively control the screen grids of the paired tubes 64—$\overline{64}$; or alternatively these screen grids will be controlled from the plate output of triode 61 for tubes 64, and from the plate output of triode 62 for tubes $\overline{64}$. Such an extended arrangement is quite obvious and does not require a special illustration.

Now, in case the accumulator 7 includes a conventional static register, an adder arrangement must be provided for the algebraic operation on the codes. Furthermore, an additional reading arrangement distinct from the one shown in Fig. 2 must also be provided as well as a device for distributing the pulses of the coded train issuing from the adder, to the trigger stages of the accumulator.

Fig. 5 illustrates the case where the accumulator comprises separate trigger stages, forming together a simple register 70. The plate outputs of one of the tubes of each trigger stage are connected to the suppressor grids of gating tubes 71 the plate outputs of which are conveniently distributed to input taps of a delay line 72. At the required instant an impulse is applied to all the control grids of tubes 71 having conductibilities depending upon the conditions of their respective controlling trigger stages. From the output 74 of delay line 72 issues a coded pulse train which carries the numerical algebraic value contained in register 70. The connections between the trigger stages, the transfer tubes and the input taps of the delay line are so provided that the first pulse period of the coded train issuing from the delay line at 74 carries the sign indication of the numerical content of register 70, and the following pulse periods of this coded train carry the digits of this numerical quantity in the direction of their increasing weights or powers.

The coded train issuing from such a reading-out arrangement is applied to one input 75 of a two-input adder 76. Adder 76 may be of any conventional kind, for instance an adder-subtractor comprising two half-adders in cascade connection. On the second input 77 of this adder 76 there is applied the coded train generated from the reading-out of the static register 10. From the output 78 of this adder, the issuing coded train is applied at 79 to the input of the delay line 72, so that the complete operation of the device needs requires a coded train to circulate twice over this delay line; it also requires two consecutive operations of adder 76 in a fashion which will be described later on. During the second passing-through of the output train of the delay line through the adder, the issuing coded train must be distributed to the separate stages of register 70. Register 70 has been reset to zero as soon as its reading was made at the start of the operation. In view of this distribution and registration of the new numerical algebraic content obtained by the algebraic summation of the two quantities, one from the register 10 and the other from the register 70, the taps of delay line 72 may again be used, by connecting them to transfer tubes 80. Each control grid of a tube 80 is connected to a definite tap of the delay line and each plate output of a tube 80 is connected to an actuation input of a trigger stage in the register 70. The tubes 80 are simultaneously unblocked for instance by an unblocking impulse applied to their suppressor grids at a time when the final coded train is suitably positioned within the delay line 72. This impulse may be applied at 81, as shown.

The use of a register capable of shifting in a step-by-step fashion permits of a marked restriction of the apparatus, as shown in Fig. 4. The static accumulator comprises such a shiftable register and an adder. The output of the last trigger stage, S, is connected to the input 75 of adder 76, and the output 78 of this adder is connected to the actuation input of the first trigger stage I of the register.

The cascade connection of the trigger stages is established as follows: An asymmetrical actuation input is provided for each stage, for instance to the control grid of one of its two tubes, and the plate output of this tube is connected to a similar actuation input of the next following stage. Each stage also presents a second actuation input to its other tube, for instance to the control grid of the other of its two tubes, and the second inputs 83 are all connected in parallel to a terminal 84 which receives the shift control pulses.

Considering for the sake of simplicity a four stage shiftable register having three digit-registration stages and a sign-registration stage, and considering further an incoming coded train at 78 carrying the algebraic value —3, viz. having the presentation 1 0 1 1 (to be read from the right to the left) as exemplifying a value of numerical quantity, the operation of such a shiftable register, well-known per se, may be summed up as follows:

At the first pulse period, the pulse actuates to its binary-one condition the first stage, I, of the register and, before the second pulse period, a shifting pulse at 84 resets stage I to its binary-zero condition thus producing from this stage a pulse which sets the stage II to its binary-one condition. Any shift control pulse cannot have any effect upon a stage which is in its binary-zero condition.

At the second pulse period, the pulse which exists in that period at 78 sets the stage I to its binary-one condition: the shift control pulse in this pulse period resets both the stages I and II to their binary-zero conditions, but the pulses thus issuing from these stages, respectively, set stages II and III to their binary-one conditions. At the third pulse period, no pulse is present at 78, and the shift control pulse resets the second and third stages to their binary-zero conditions, and these resettings will bring stages III and IV to their binary-one conditions. At the fourth pulse period, the pulse appearing at 78 sets the stage I to its binary-one condition, and no shift control pulse exists during said period. The register remains with its first, third and fourth trigger stages in their binary-one conditions, as required for the registration of the code which has been used as an example.

For performing a reading-out of this registration, four shift control pulses are applied to terminal 84. The first pulse resets stages I, III and IV to their binary-zero conditions but stage IV delivers an output pulse and stages II and IV are set to their binary-one conditions. The second shift control pulse produces the delivery of another output pulse from the fourth stage and the progression by one step of the register, the third stage III being set to its binary-one condition while the second stage II is turned back to its binary-zero condition. The third shift control pulse does not produce any output pulse but shifts the registration from the third to the fourth trigger stage. Finally, the fourth shift control pulse produces the delivery of a further output pulse and the register then remains in its overall zero condition.

Since a step-by-step registration occurs, and similarly a reading-out progresses in a step-by-step fashion, it is clear that these operations may be made during a single time interval. Considering for instance a four stage register containing the algebraic quantity +3, viz. having its stage I in its binary-zero condition, its second and third stages in their binary-one conditions and its fourth stage S in its binary-zero or plus-sign condition, and further considering an input coded train at 77 so encoded as to represent the numerical quantity +1, viz. 0 1 0 0 (read from left to right), the operation is as follows:

The first shift control pulse produces the progression by one step of the registration, which becomes 0 0 1 1. No output pulse is delivered at 75 and no pulse exists at 77, hence at 78.

The second shift pulse produces the progression by one step of the register, and the registration becomes 0 0 0 1. An output pulse is delivered at 75 and coincides with the first discrete pulse of the incoming train at 77. This coincidence cancels out, as is well-known, any output pulse from the adder 76 but, within this adder, it produces a carry pulse which is delayed by a pulse period, as usual.

The third shift control pulse makes the registration to progress by one step and the register then assumes the setting 0 0 0 0. Within the adder, the carried-over pulse coincides with the second discrete pulse of the fedback train. Again no pulse issues from the adder but within the adder a new carry pulse is produced, which is delayed by a pulse period.

The fourth shift control pulse does not change at all the condition of the register but the output from the adder delivers an impulse which actuates stage I to its binary-one condition. The register is set to the overall condition 1 0 0 0, representing the numerical value +4.

Considering now that the following operation will consist of introducing the quantity —1 to be algebraically added to +4: the incoming train will be 1 0 1 1, read from left to right.

The first shift control pulse merely displaces by one step the content of the register, from 1 0 0 0 to 0 1 0 0 but the first discrete pulse of the incoming train passes through adder 76 and actuates the stage I to its binary-one condition. The register is set to 1 1 0 0.

The second shift control pulse produces the progression by one step of the registration, which becomes 0 1 1 0. No discrete pulse exists in the incoming train.

The third shift control pulse again produces a progression by one step of the registration which becomes 0 0 1 1. The discrete pulse of the incoming train passes through the adder and sets the stage I of the register to its binary-one condition. The registration becomes 1 0 1 1.

The fourth shift control pulse further advances by one step the registration which becomes 0 1 0 1 and makes the fourth stage deliver an output pulse at 75. This pulse is coincident with the discrete pulse of the incoming train in that pulse period. No output pulse is delivered by the adder but within this adder a carry pulse is formed, which is delayed by a pulse period.

The fifth shift control pulse produces a further progression of the register; the registration becomes 0 0 1 0 and also produces an output pulse from stage IV which is applied at 75 to the adder wherein it coincides with the carried pulse. No output pulse is delivered by the adder but a new carry pulse is formed therein, which is delayed by one pulse period.

The sixth shift control pulse brings the register to condition 0 0 0 1 but the carry pulse from preceding operation passes through the adder and issues at 78, thus actuating stage I to its binary-one condition. The registration becomes 1 0 0 1.

The seventh shift control pulse brings the register to condition 0 1 0 0, and output pulse from stage IV is fed back to the adder, passes through this circuit and actuates to its binary-zero condition stage I of register. The registration becomes 1 1 0 0.

The eighth and last shift control pulse brings the register to the overall condition 0 1 1 0, viz. +3, which is the correct result of the operation.

A totalization of algebraic quantity representations apparently requires two complete cycles of shift control of the accumulator, while a totalisation of arithmetical quantity representations requires only one cycle of shift control. It may also be noted that the totalisation of two negative quantities requires a pair of shift control cycles.

In either Fig. 4 or Fig. 5, the incoming coded pulse trains applied at input 77 of adder circuit 76 is derived from the reading circuit 6 of the static register 10 of Fig. 2. For instance, reading circuit 6 is such as shown in Fig. 4, that is to say quite similar to the circuit 6 as detailed in Fig. 3 except for the control of tubes 63 and 64. At the reading periods, the pentode 63 receives on its control grid, at 67, a coded pulse train comprising a discrete pulse at its first pulse period, no pulse at its second pulse period and a discrete pulse at each following pulse periods. This coded train carries the numerical value −1 and presents as many pulse periods as there exist trigger stages in the register (from I to S, inclusively). Pentode tube 64 only receives on its control grid a coded pulse train having but a discrete pulse at its second pulse period, thus carrying the digital value +1.

When static register 10 comprises a plurality of digital value recording stages, both sets of tubes 64 and $\overline{\mathbf{64}}$ are provided as stated above, but in this case tube 63 is preserved and controlled as stated, and the pairs of tubes 64—$\overline{\mathbf{64}}$ receive only a test pulse on their control grids: The pair controlled by the trigger stage of the static register 10 which registers the digital value 1 receives this test pulse at the second pulse period, the pair controlled by the trigger stage of the register 10 which registers the digital value 2, receives the test pulse at the third pulse period, and so forth. The reversed conductibilities of the tubes 64—$\overline{\mathbf{64}}$ of any pair are controlled from such tubes, as shown in Fig. 3 at 61, 62.

Instead of introducing merely one unit at each detection of variation of the entry level, it is possible by well known means for quantification, to introduce into the totalizer, numeric codes representing a variation of more than one step and, therefore, representing more than one binary unit.

I claim:

1. In an analog-to-digital converter, a static accumulator of binary-digital representation voltage values and a decoder for its output, a static register for binary-digital representative voltage values and a decoder for its output, means for comparing an input with the output of the decoder of said static accumulator, means for adding thereto the output of the decoder of said static register, means under control of said comparing means for varying said static register until the output from its decoder balances out the comparison output, and means for algebraically adding the binary-digital representation of said comparison output to the binary-digital representation in said static accumulator, said static register comprising at least one pair of separate bi-stable digit registering stages one of which is a sign-registering stage.

2. In an analog-to-digital converter, a static accumulator of binary digital representation voltage values and a decoder for its output, a static register for binary-digital representative voltage values and a decoder for its output, means for comparing an input with the output of the decoder of said static accumulator, means for adding thereto the output of the decoder of said static register, means under control of said comparing means for varying said static register until the output from its decoder balances out the comparison output, and means for algebraically adding the binary-digital representation of said comparison output to the binary-digital representation in said static accumulator, said static register comprising at least one pair of separate bi-stable digit registering stages one of which is a sign-registering stage, and said means for varying said static register including means for periodically resetting said register to a predetermined overall condition and means for sequentially setting the stages of said register and selectively resetting each of said sequentially set stages under control of said comparison output.

3. In an analog-to-digital converter, a static accumulator of binary digital representation voltage values and a decoder for its output, a static register for binary-digital representative voltage values and a decoder for its output, means for comparing an input with the output of the decoder of said static accumulator, means for adding thereto the output of the decoder of said static register, means under control of said comparing means for varying said static register until the output from its decoder balances out the comparison output, and means for algebraically adding the binary-digital representation of said comparison output to the binary-digital representation in said static accumulator, said static accumulator comprising an algebraic reversible multi-stage pulse counter and means under control of said static register for controlling the direction of said pulse counter, means being further provided for applying to the actuation input of the first stage of said counter a number of pulses corresponding to the numerical content of said static register.

4. In an analog-to-digital converter, a static accumulator of binary-digital representation voltage values and a decoder for its output, a static register for binary-digital representative voltage values and a decoder for its output, means for comparing an input with the output of the decoder of said static accumulator, means for adding thereto the output of the decoder of said static register, means under control of said comparing means for varying said static register until the output from its decoder balances out the comparison output, and means for algebraically adding the binary-digital representation of said comparison output to the binary-digital representation in said static accumulator, readout means for delivering an algebraically coded pulse train representing the setting of said static register, said static accumulator including a resettably shiftable static register and a coded pulse adder circuit having inputs connected, respectively, to the outputs of said read-out means and of said shiftable register, and means for simultaneously controlling the derivation of the pulse trains from said read-out means and from the resetting shift of said accumulator register.

5. In an analog-to-digital converter, a static accumulator of binary digital representation voltage values and a decoder for its output, a static register for binary-digital representative voltage values and a decoder for its output, means for comparing an input with the output of the decoder of said static accumulator, means for adding thereto the output of the decoder of said static register, means under control of said comparing means for varying said static register until the output from its decoder balances out the comparison output, and means for algebraically adding the binary-digital representation of said comparison output to the binary-digital representation in said static accumulator, readout means for delivering an algebraically coded pulse train representing the setting of said static register, and said static accumulator including another static register having separate bi-stable registering stages, a pulse train distributor for said stages and a read-out circuit for the derivation of a coded pulse train from its registration, and a coded pulse train adder circuit having inputs connected, respectively, to the outputs of read-out means and read-out circuit, and an output connected to the input of said pulse distributor, overall resetting means being further provided for said registering stages.

6. In an analog-to-digital converter, a static accumulator of binary-digital representative voltage values and a decoder for its output, means for comparing an analog representative input with the output of said decoder, means for deriving from the comparison output a binary-digital representation thereof including means for setting an arbitrary digital representation and deriving therefrom an arbitrary analog representation and means for so varying said arbitrary digital representation that its corresponding analog representation balances said comparison output, further means being provided for deriving from the balancing value of said arbitrary digital representation a coded pulse train; and means for algebraically adding said coded pulse representation to the contents of said static accumulator.

7. In an analog-to-digital converter, a static accumulator of binary-digital representative voltage values and a decoder for its output, means for comparing an analog representative input with the output of said decoder, including means for receiving an analog representative input and subtracting therefrom the output of said decoder so as to obtain a difference representation, and means for algebraically adding to said representation a third analog representation, means for so varying said third representation that the difference from the subtraction is balanced out, and means for deriving from said third representation at its balancing value a binary-digital representation, and means for algebraically adding said binary-digital representation to the contents of said static accumulator.

8. An analog-to-digital converter comprising in combination a static accumulator for binary-digital representation voltage values and a decoder for its output, input means including means for receiving an analog-representative voltage, and subtracting therefrom the output voltage of said decoder so as to form a difference voltage and, means for algebraically adding to said voltages a third analog-representative voltage, means for so varying said third voltage that said difference is balanced out, and means for deriving from said third voltage at its balancing value a binary-digital representation and means for algebraically adding said binary-digital representation to the binary-digital representation contained in said static accumulator.

9. An analog-to-digital converter comprising in combination a static accumulator for binary-digital representative voltage values and a decoder for its output, a static register for binary-digital representative voltage values including at least one pair of separate bistable digit registering stages, one of which is a sign-registering stage, and a decoder for its output, input means including means including means for receiving an analog-representative voltage and means for subtracting therefrom the output voltages of the decoder of said static accumulator so as to form a difference voltage and adding thereto the output voltage of the decoder of said static register; and a comparison circuit; means under control of said comparison circuit for varying the setting of said register until the voltage from its decoder balances out said difference voltage, means for reading the setting of said static register upon balancing said difference voltage, and means for algebraically adding the difference binary-digital representation thus formed to the binary-digital representation contained in said accumulator.

10. An analog-to-digital converter according to claim 9 wherein said means for varying the setting of said static register include means for periodically resetting said register to a predetermined overall condition and means for periodically sequentially setting the stages of said register and selectively resetting each of said sequentially set stages under the control of the output of said comparison circuit.

11. An analog-to-digital converter comprising in combination a static accumulator for binary-digital representative voltage values including an algebraic reversible pulse counter and an input circuit for controlling the direction of counting of said counter, and a decoder for its output, a static register for binary-digital representative voltage values including a sign-registering bistable stage and at least one digit-registering bistable stage, and a decoder for its output, means being provided for controlling the condition of said input circuit from said sign-registering stage of the static register, and further means being provided for applying to the actuation input of the first stage of said counter a number of pulses corresponding to the numerical content of said static register; input means including means for receiving an analog-representative voltage and means for subtracting therefrom the output voltages of the decoder of said static accumulator so as to form a difference voltage and adding thereto the output voltage of the decoder of said static register, means for varying the setting of said register until the voltage from its decoder balances out said difference voltage, means for reading the setting of said static register upon balancing said difference voltage, and means for algebraically adding the difference binary-digital representation thus formed to the binary-digital representation contained in said accumulator.

12. An analog-to-digital converter comprising in combination a static accumulator for binary-digital representative voltage values and a decoder for its output, a static register for binary-digital representative voltage values and a decoder for its output, input means including means for receiving an analog-representative voltage and means for subtracting therefrom the output voltages of the decoder of said static accumulator so as to form a difference voltage and adding thereto the output voltage of the decoder of said static register, means for varying the setting of said register until the voltage from its decoder balances out said difference voltage, means for reading the setting of said static register upon balancing said difference voltage, said means for reading the setting of said static register being so provided as to deliver an algebraically coded pulse train and said static accumulator including a resettably shiftable static register and a coded pulse adder circuit having inputs connected, respectively, to the outputs of said reading means and said shiftable register, means for simultaneously controlling the derivation of the pulse trains from said reading means and from the resetting shift of said accumulator register; and means for algebraically adding the difference binary-digital representation thus formed to the binary-digital representation contained in said accumulator.

13. An analog-to-digital converter comprising in combination a static accumulator for binary-digital representative voltage values and a decoder for its output, a static register for binary-digital representative voltage values and a decoder for its output, input means including means for receiving an analog-representative voltage and means for subtracting therefrom the output voltages of the decoder of said static accumulator so as to form a difference voltage and adding thereto the output voltage of the decoder of said static register, means for varying the setting of said register until the voltage from its decoder balances out said difference voltage, means for reading the setting of said static register upon balancing said difference voltage, said means for reading the setting of said static register being so provided as to deliver an algebraically coded pulse train and said static accumulator including another static register having separate bistable registering stages, a pulse train distributor for said stages and a reading circuit for the derivation of a coded pulse train from its registration, and a coded pulse train adder circuit having inputs connected respectively to the outputs of said reading means and said reading circuit and an output connected to the input of said pulse distributor, overall resetting means being further provided for said registering stages; and means for algebraically adding the difference binary-digital representation thus formed to the binary-digital representation contained in said accumulator.

References Cited in the file of this patent

UNITED STATES PATENTS

| | | |
|---|---|---|
| 2,451,044 | Pierce | Oct. 12, 1948 |
| 2,516,587 | Peterson | July 10, 1950 |
| 2,539,623 | Heising | Jan. 30, 1951 |
| 2,568,724 | Earp et al. | Sept. 25, 1951 |
| 2,610,295 | Carbrey | Sept. 9, 1952 |
| 2,617,879 | Sziklai | Nov. 11, 1952 |
| 2,700,750 | Dickinson | Jan. 25, 1955 |
| 2,718,634 | Hansen | Sept. 20, 1955 |
| 2,784,396 | Kaiser et al. | Mar. 5, 1957 |
| 2,836,356 | Forrest et al. | May 27, 1958 |